(12) United States Patent
Beck et al.

(10) Patent No.: US 8,988,248 B2
(45) Date of Patent: Mar. 24, 2015

(54) DATA TRANSMISSION METHOD AND DEVICE FOR A/C SYSTEMS

(75) Inventors: Wilfried Beck, Wiesbaden (DE); Ralph Hofmann, Dillenburg (DE)

(73) Assignee: AIZO AG, Wetzlar (DE)

( * ) Notice: Subject to any disclaimer, the term of this patent is extended or adjusted under 35 U.S.C. 154(b) by 1761 days.

(21) Appl. No.: 11/664,183

(22) PCT Filed: Sep. 29, 2005

(86) PCT No.: PCT/EP2005/010544
§ 371 (c)(1),
(2), (4) Date: Oct. 10, 2008

(87) PCT Pub. No.: WO2006/034866
PCT Pub. Date: Apr. 6, 2006

(65) Prior Publication Data
US 2009/0027175 A1   Jan. 29, 2009

(30) Foreign Application Priority Data
Sep. 29, 2004   (DE) .......................... 10 2004 047 082

(51) Int. Cl.
| | |
|---|---|
| *H04B 5/00* | (2006.01) |
| *H04B 1/38* | (2006.01) |
| *H02J 7/00* | (2006.01) |
| *G08C 19/02* | (2006.01) |
| *G08B 1/08* | (2006.01) |
| *B60Q 1/00* | (2006.01) |
| *H04B 3/54* | (2006.01) |

(52) U.S. Cl.
CPC .......... *H04B 3/54* (2013.01); *H04B 2203/5412* (2013.01)

USPC .................. 340/854.8; 340/12.32; 340/13.33; 340/538; 340/572.1; 340/10.1; 320/106; 320/108; 320/138; 455/41.1; 455/41.2; 455/572; 455/343.2; 235/380

(58) Field of Classification Search
USPC ...................... 340/538–538.17, 12.32–12.39; 307/2–4; 455/41.1, 41.2
See application file for complete search history.

(56) References Cited

U.S. PATENT DOCUMENTS

| | | | |
|---|---|---|---|
| 3,818,466 A | 6/1974 | Honda | |
| 3,964,048 A * | 6/1976 | Lusk et al. .................... | 178/2 R |
| 4,114,141 A * | 9/1978 | Travis ......................... | 340/10.41 |
| 4,200,862 A * | 4/1980 | Campbell et al. .......... | 340/12.32 |
| 4,300,126 A * | 11/1981 | Gajjar .............................. | 307/17 |
| 4,429,299 A * | 1/1984 | Kabat et al. .................. | 340/4.21 |
| 4,429,366 A | 1/1984 | Kennon | |
| 4,609,839 A * | 9/1986 | Howell ......................... | 327/310 |
| 4,642,637 A | 2/1987 | Baer | |
| 4,914,431 A | 4/1990 | Severson et al. | |

(Continued)

FOREIGN PATENT DOCUMENTS

| | | |
|---|---|---|
| EP | 1134910 | 9/2001 |
| WO | 99/48340 | 9/1999 |

*Primary Examiner* — Fekadeselassie Girma
(74) *Attorney, Agent, or Firm* — The Webb Law Firm

(57) ABSTRACT

A method for modulating the effective power in one or several power consuming devices disposed in an A/C system in order to transmit data on a power supply line thereof by specifically varying the effective power in the connected device. In order to transmit the data, the momentary value of the effective power is randomly varied (increased or decreased), and the data is impressed into the A/C supply line by a unit (transmitter or modulator) and is evaluated by another unit (receiver or demodulator).

13 Claims, 1 Drawing Sheet

(56) References Cited

U.S. PATENT DOCUMENTS

| | | | |
|---|---|---|---|
| 5,365,154 A | 11/1994 | Schneider et al. | |
| 5,491,463 A * | 2/1996 | Sargeant et al. | 340/12.37 |
| 5,581,229 A * | 12/1996 | Hunt | 370/482 |
| 5,614,811 A * | 3/1997 | Sagalovich et al. | 323/207 |
| 5,717,685 A * | 2/1998 | Abraham | 370/276 |
| 5,841,807 A * | 11/1998 | Hannebauer et al. | 375/142 |
| 5,844,949 A * | 12/1998 | Hershey et al. | 375/346 |
| 5,970,127 A * | 10/1999 | Smith et al. | 379/142.01 |
| 6,377,163 B1 * | 4/2002 | Deller et al. | 307/2 |
| 6,476,521 B1 * | 11/2002 | Lof et al. | 307/105 |
| 7,027,483 B2 * | 4/2006 | Santhoff et al. | 375/130 |
| 7,170,405 B2 * | 1/2007 | Daum et al. | 340/538.11 |
| 8,207,635 B2 * | 6/2012 | Covaro | 307/112 |
| 2004/0037221 A1* | 2/2004 | Aisa | 370/229 |
| 2004/0109499 A1 | 6/2004 | Cern | |
| 2005/0100102 A1* | 5/2005 | Gazdzinski et al. | 375/242 |

\* cited by examiner

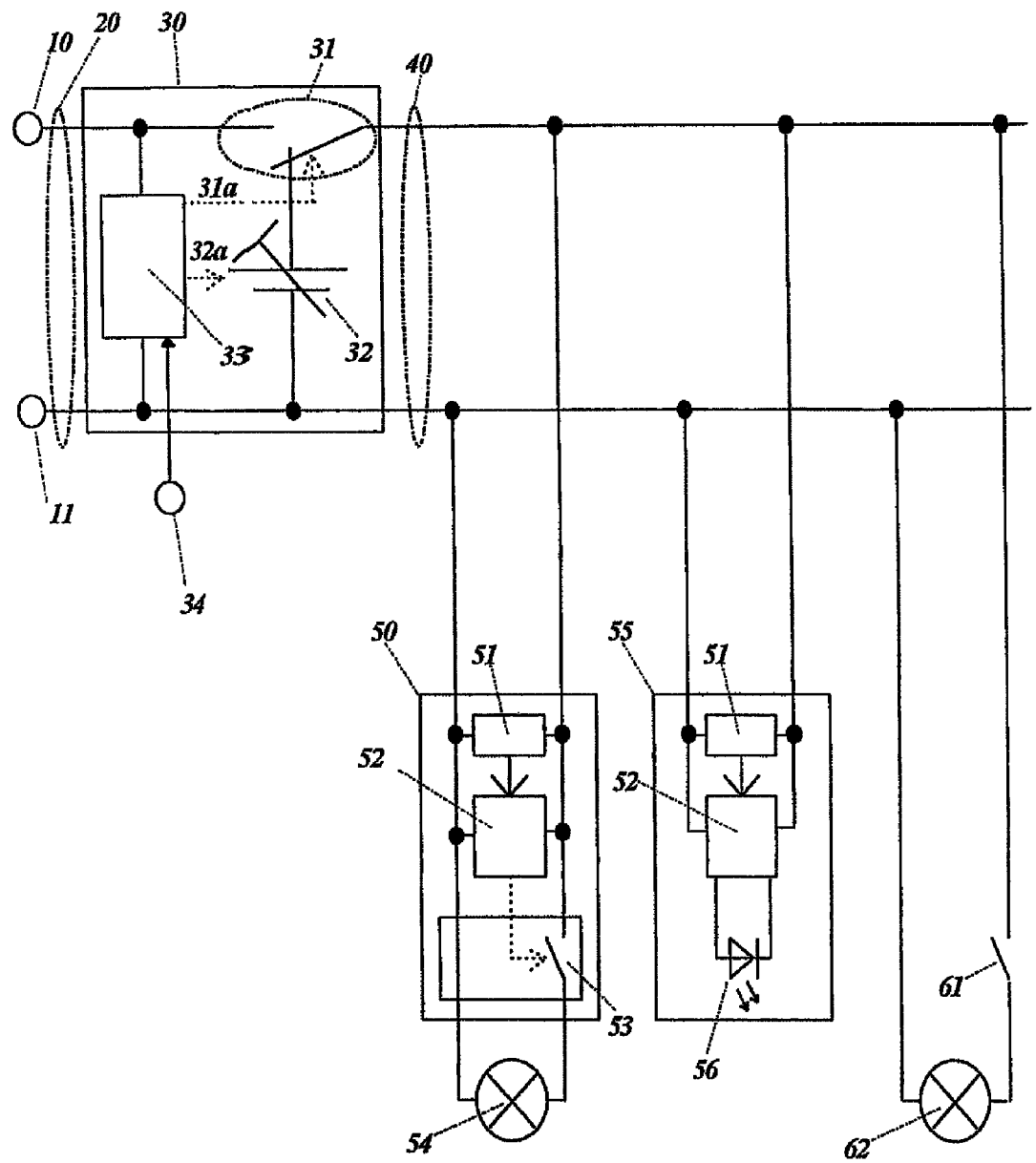

DATA TRANSMISSION METHOD AND DEVICE FOR A/C SYSTEMS

BACKGROUND OF THE INVENTION

1. Field of the Invention

The present invention relates to a method for modifying the effective power in one or several power consuming devices disposed in an A/C system in order to provide data transmission capabilities via a power line thereof.

2. Description of Related Art

What can be taken from the present state of art (like the U.S. Pat. No. 5,491,463) are methods to individually control appliances, whereby address-data as well as control-data are fed in the zero-crossings of the supplying power. Hereby the disadvantage is provided, that an additional 120 kHz-Generator is necessary to create particular burst signals and it is also necessary that the receiver has to provide complex detector circuits to enable said feeding in said zero-crossings.

What is also known, for instance derivable from EP 1 134 910, is a method defining different types of bits by changing the duration of zero-crossings or by blanking the supplying voltage herewith enabling it to detect said different types of bits as well as to detect the respective control data for a receiver of said data by help of only a simple circuit.

Using said method it is technically possible supply data to a plurality of power consuming devices which are all connected to said AC-power-supply line, by interrupting said power line in the case of a zero-crossing of the sinus curve of the voltage close to the zero crossing (i.e. "blanking"). Due to said concept, none of the power consuming devices may comprise and provide any capacitive power-portions, since they would disturb the respective zero-crossing of the supplying voltage-sinus-curve. Consequently said state of art teaches that only power consuming devices can be attached, which show pure ohmic behaviour without any capacitive or inductive portions, which means that they show a phase angle of almost zero, since in any other case the zero-crossing would be overlaid by the reactive current of the respective power consuming device showing capacitive or inductive behaviour.

The methods taught by the state of art provide the same disadvantage which is not to providing any possibility to transfer data as long as electronic devices are connected to said power-line, supposed to transfer said data, providing capacitive or inductive portions of power, like for instance electric motors, kitchen devices, electric tools, fluorescent lamps, electronic devices, like a PC, TV, HiFi-Rack.

Consequently the solutions taught by the state of art are neither appropriate to teach any transfer of data or is only able to teach a transfer of data in a very limited way.

SUMMARY OF THE INVENTION

It is an object of the invention to provide a method as well as a device to enable a transmission of data in an AC-power supply network particularly in every stressful and high-pressure situation said network is also comprising for instance ohmic and/or capacitive and/or inductive power consuming devices, which means that each of said respective receivers connected to said power consuming network can be controlled individually.

The objective is reached by the features of the independent claims. Advantageous embodiments are claimed in the respective subclaims.

To provide a method to transmit data via a the power-supply at least one first unit (also called "sender" or "modulator") is necessary, by which data can be impressed into said AC-power-supply-line and at least one second unit (also called "receiver" or "demodulator") is necessary, capable to receive and analyze said transmitted data, whereby said first unit and said second unit are connected by a line, said line is usually identical with said supply-line providing power to said power consuming devices connected to it and which itself is connected to an AC-power-supply to receive energy.

Varying not the whole power, but the effective power portion exclusively by shift keying, causing the transmission of data according to the method presently described is effected by the modulator, by varying the instantaneous amount of the effective power portion in the respectively connected power consuming device at the moment of said shift keying exclusively The receiver comprises all the technique necessary to recognize and to analyze any deviation from the regular effective-power-sinus-curve of the type "impressed modulation" previously mentioned. In order to transfer said data the instantaneous amount of the effective power portion is alterable freely by increasing or decreasing said instantaneous amounts of effective power respectively, such that said characteristic alterations can be analyzed by an appropriate receiver.

A device or a system respectively, capable to execute said method can comprise a plurality of power consuming devices and receivers, i.e. demodulators. The logic of the data transmission (i.e. the protocol) can be designed in such a way, that one single data-unit, coded by a shift keying, or a plurality of them combined together do address only one single demodulator or alternatively do address a plurality of demodulators at the same time. It can also happen, that transmitted data does not address any demodulator or that in the respective system no demodulator is available, which might be addressed by said data.

Hence, the present invention is related to a method for modulating the effective power in one or several power consuming devices disposed in an A/C system in order to provide transmission of data via said power supply line, by specifically varying the effective power in said power consuming device connected. The term "modulation" is defined to vary the instantaneous amount of the effective power portion in a power consuming device, connected to of the effective power in a characteristic manner, i.e. in a manner deviating from the regular sinus-curve.

Said variation is limited in its duration upon a fraction of one sinus-half-wave and the amplitude of said variation is shaped in such a way that in the temporal average said amplitude does not provide any perceptible change in the characteristic operations of the respective power consuming device. This means that said variation commonly is significantly lower than one percent of the non modulated power, but at the moment of modulation, said instantaneous amount of the power is typically varied for more than 10%.

The duration of said modulation usually takes from 10 to 100 microseconds during said variation of said instantaneous amount.

Herewith the advantage is provided that said behaviour of the respective power consuming device does not show any variation, caused by said modulation.

It is a further advantage of said modulation, that by such an impression of a variation of the instantaneous amount of said effective power described, the respective data can be transported via said power supply line in a very reliable manner and can be analyzed by an appropriate receiver-circuit in a reliable way also as well as with low effort.

According to the present invention high-frequency modulation (HF-modulation) can be avoided to transmit data, since such a HF-modulation in the present field of operation causes difficulties as well as interaction by crosstalk and/or loss of signals caused by a limited HF-capability of power lines.

Additionally in the case that no HF-capability is required the analyzing-circuit can be designed in a more simple way, which means that it can said circuit be designed cost efficient as well as compact.

The invention is also related to a method to control a plurality of power consuming devices, connected to a power supply line, whereby the effective power is altered exclusively in order to transmit data via a power supply line by modulating said effective power portion only in said one or more power consuming devices, connected to a AC-power-supply-network. This also means that exclusively the instantaneous amount of the effective power is mentioned herewith.

Here fore the person skilled in the art recurs to the following meaning of the term "effective power":

$$U(t) = \hat{U} * \sin(2*Pi*Ct) \quad (1)$$

U(t)=instantaneous amount of the voltage, Ü=maximum of the voltage,
Pi=3.141592654
f=rated frequency of the AC-voltage
t=time in seconds
sin=sinus-function The mathematic sinus-function is defined by the angle in radian measure. In the case that such a voltage is used as a power supply of electrical power consuming devices, said power consuming devices can be distinguished into two groups generally:
a) ohmic power consuming device (also known as "active load")
b) inductive or capacitive power consuming device (also known as "reactive load")

The ohmic power consuming devices are characterized in that the instantaneous amount of the current I(t) always follows the following equation:

$$I(t) = \hat{U} * \sin(2*Pi*Ct)/R U(t)/R \quad (2)$$

This current I(t) is defined as "active current".
I(t)=instantaneous amount consumed by the power consuming device
R=ohmic resistor of the power consuming devices.

The inductive or capacitive power consuming devices are characterized in that a correction value has to be introduced into equation (2) describing the current profile:

$$I(t) = \hat{U} * \sin(2*Pi*f*t+phi)/X \quad (3)$$

This current I(t) is defined as "reactive current".
phi=phase angle
X=reactive part of impedance of the power consuming device, replacing the resistor in (2).

The so called "phase angle" phi is Pi/2 for capacitive loads and −Pi/2 for inductive loads. The reactive part of impedance X is a virtual resistor, which does not have a constant value, but depends on the frequency f, what an ohmic resistor does not. It is an operand with a crucial significance in the theory of AC-technique.

In real life both types of load usually appear combined with each other. The instantaneous amount of the current can be described by the equation $$I(t) = \hat{U} * \sin(2*Pi*f*t+phi)/Z, \quad (4)$$

whereby the phase angle phi according to the invention now can become any value. This so called "apparent current" practically appears as a combination of active current and reactive current. The respective portions of active current as well as of the reactive current from said apparent current can be calculated mathematically. Hence one can talk from an active current and from a reactive current which both are comprised by the apparent current.

Z=impedance of the power consuming device

The impedance of the power consuming device is an important operand in the theory of AC-technique also. In the case that a plurality of ohmic, capacitive, inductive power consuming devices or even of a combination of them are connected to an AC-power supply line, their combined effect can be summarized regarding to their effect upon the power supply as well as it can be summarized according to the method presently described, whereby the consumption of current is described by the equation (4), using appropriate values for Z as well as for phi.

In the case that the phase angle phi is different than zero, an amount of current different then zero is flowing through said power consuming device. This is a crucial aspect for operating the method previously described and it is a crucial aspect to distinguish from other methods. The method according to the present invention teaches to vary the sinus-curve at any optional moment of the sinus curve, which also comprises the parts of the sinus-curve distinct from the zero crossings of the effective power in the power consuming device(s) connected by techniques known by the person skilled in the art. This means that by an appropriate technique selected by the person skilled in the art effective power is varied in the respective power consuming device(s) selectively at any stage of the sinus-wave, such that an appropriate "demodulator" can detect said "modulation" even in then cases that the instantaneous amount of the current I(t) might be different from zero at the moment of blanking According to the invention, the effect is achieved, that a transmission of data is also available in cases in which power consuming devices connected to said power supply network are showing an ohmic or a inductive or a capacitive behaviour, while contrary to this effect, according to solutions taught in the state of art (like taught in EP 1 134 910) only devices can be controlled, showing pure ohmic behaviour, like electric bulbs for instance. According to the invention the state of art obstacle that only power consuming appliances showing pure ohmic behaviour can be addressed is overcome by varying exclusively the effective power portion by shift keying. Said method according to the invention is capable to ensure a transmission of data even in configurations, in which a power consuming appliance also shows inductive or capacitive behaviour, like for instance electrical driven engines, kitchen appliances, electrical driven tools, fluorescent lamps, electronic appliances, like PCs, TVs, HiFi-Racks can be connected to said power supplying network, which according to the invention is also dedicated to transfer said data.

Hence the term "modulation" according to this invention is defined describing the change of exclusively the effective power portion in the power consuming devices connected, at an arbitrarily moment of the sinus-wave of the supplying current. To realize this practically, the instantaneous amount of the voltage of the power consuming device will be forced to change. Therefore all the circuit-technology necessary for that is comprised by the so called modulator. Said circuit-technology is capable to operate said change of the voltage quick enough on the one side and is also capable to guide the apparent current flowing at the moment of shift keying on the other side. Herewith corruption of the modulation caused by the reactive currents can be avoided also, which is a further crucial problem for the person skilled in the art being advised by the state of art only.

According to the present invention various data carrier are appropriate: According to the inventions method, analogous data can be coded by impressing a code into the amount of said shift keying or by impressing a code into the duration of said shift keying.

According to the inventions method, digital data can be coded in a simple manner already by the pure existence or non existence of blanking at a particular moment.

The transmission of digital or analogue data in a manner that said data can also get analyzed, i.e. that they can get reidentified, after transmission by varying the intensity of shift keying and/or by varying the duration of shift-keying is specifically operated by varying the effective power portion as described above. In order to transmit said data, variation of the instantaneous amounts of the effective power portion by a definable arbitrarily amount, i.e. an increase or a decrease are both possible, whereby the respective amount of said variation might represent a code for an analogue information for instance and the pure existence of a variation might represent a code for a digital data as already mentioned previously. In this particular context the term "analogue data" is such defined that the duration and/or intensity of the variation themselves is a numerical analyzable value. In this particular context the term "digital data" is such defined that already the fact of being a data per se is already an analyzable value.

It is also possible that according to the method previously described, also a plurality of modulators are operating simultaneously by allocating each particular modulator to a particular portion of a phase in which each of them can execute his particular modulation. This means that the method according to the invention also allows to operate more than one modulator simultaneously, which means that in the case that they are connected in a series they can operate simultaneously for by allocating a portion of time of a single sinus curve-period instance to a particular modulator, during which said particular modulator can execute his shift keyings. Such a simultaneous operation of a plurality of modulators allocated in a series, which means that they operate in series, is possible in the case that a particular portion of the phase is allocated to a particular modulator.

By an appropriate choice of the moment of the shift keying, whereby the moment of the modulation occurring is mentioned, also the noise caused in the power supply network by all the other power consuming devices is reduced. Also this effect is practically realized by shift keying of the effective power by the modulation described above, realizable at any moment of the sinus-wave, whereby by an appropriate choice of the moment of blanking the noise (electromagnetic noise) previously impressed can be reduced so intense, that said noise can be kept under any threshold desired by the operator.

It is for however disadvantageous to cause a modulation having the shape of an augmentation of said instantaneous amount of the effective power particularly at the peek of said networks-sinus-voltage, since in this constellation the power consuming devices can be confronted with high peeks of current occurring, leading to a electromagnetic noise undesirable high.

According to the invention it is getting possible to transmit analogue or digital data via any ordinary power supplying network to which a plurality of power consuming devices are connected by choosing an appropriate modulation, respecting hereby also all the standards necessary, like for instance narrowing the electromagnetic noise, safe-guarding of the power of the power-consuming device necessary, autonomy from reactive current.

Said modulator can be set up in a unit, or even in a plurality of distributed units which can also be allocated at different places of the power supply line. In the case that the modulator necessary for the method is set up in one single unit only, a space-saving and structured wiring of the system is possible In the case that for said method one or more modulators are used, allocated at different places of said power supply line, then all said elements, which together constitute such a modulator can be allocated at points in said power supply network, which are convenient for the flow of energy in said power supply lines.

Operating said data received can also be integrated in the technique of the demodulator, like for instance by a micro controller which is integrated in said demodulator and which executes combined tasks like decoding received data and continue processing at the same time and like for instance evaluating, interpreting, releasing them as switch- control- or data-signal. Herewith the advantage is provided that for instance the control-unit of one of said power-consuming-devices, like for instance a lamp or a dimmer can also comprise such a receiving unit which means that they can be remote controlled.

The conversion of said data received can also be executed apart from said technique comprised by said demodulators. Said demodulator can be coupled to any subsequent conversion devices which are able to convert said data previously received or which are able to operate said data.

A demodulator can be connected to a power consuming device, in order to control it by data transmitted by a modulator or in order to be connected and to be positioned to said power supply line distantly in order to forward said data previously received in an effective way, said data are for instance radio signals or infrared signals, acoustic signals or optical signals or the like. Said modulator can be coupled to any input devices like for instance a simple on-off-switch up to complex input devices, all of them capable to create data to be forwarded.

BRIEF DESCRIPTION OF THE DRAWING

A particular embodiment is shown in FIG. 1. FIG. 1 particularly shows a block-diagram of a system according to the invention.

FIG. 1 represents an example of a system according to the invention, whereby a sender-unit (Modulator 30) and a plurality of receiving-units (demodulators) and power consuming devices are shown.

DETAILED DESCRIPTION OF THE INVENTION

In FIG. 1 numbers 10 and 11 are indicating the feed-in poles of the power supply network, to which several power consuming devices are connected to, which in the present case is for instance a fused electric circuit of a house installation. What is also shown in FIG. 1 is an example of a circuit, how a modulator can be designed in order to execute an effective-power-variation. As shown in FIG. 1, said modulator is connected to the power consuming devices 54, 62 by an at least two-wire-cable 40, whereby at least one power consuming device 62 can be connected by the supply-line 40 directly and/or at least one power consuming device 54 can be connected to the power supply-line 40 via a further circuit of the receiving-unit 50.

Said modulator 30 comprises a switch 31, a controllable or non controllable power supply 32 and a control-unit 33, which initiates the varying of the effective power by shift keying at particularly the moment of the sinus-wave of the power-supply previously intended.

The switch 31 is advantageously an electronic switch 31, for instance designed as a circuit comprising semi-conductors, in order to switch quick, precise and without any abrasion.

The control unit 33 can comprise a micro-controller for instance and a circuit for power supply purpose according to the state of art, in order to effect the results previously described.

The control unit 33 identifies the temporal behaviour of the curve of the AC power supply fed into said network via said input-poles 10 and 11 for instance by the help of a threshold-switch and/or by a timer synchronized to said AC-power supply of said network, hereby controlling the switch 31 by the phase angles of the respective sinus waves, either defined constructively or by software in such a way (see action line 31a), that the connection between the power consuming device supply line 40 and the input lines 20 is interrupted and the voltage source 32 instead defines the voltage upon said power consuming device supply line.

Said voltage source can be realized by a battery for instance, or by a capacitor with a capacitance sufficient enough to comprise an appropriate load-circuit, or for instance also by an electronic power supply circuit. In a particular system, the value "zero" can be allocated to the voltage supply 32 also.

After a period of time defined constructively or by software, said control unit 33 reswitches said power consuming device supply line 40 back to the input supply lines 20.

Herewith the effect is provided, that at any moment of the sinus curve of the network-power supply said power consuming device supply line 40 can be disconnected from the input connectors 10, 11 and can be handed over to the variable or not variable voltage supply source 32 for a time period previously definable. By choosing a short termed shift keying and by adjusting the phase angle appropriately, by which said hand-over can be realized and by the voltage which is impressed to said power consuming device supply line by force at particularly said moment by said adjustable or not adjustable power supply 32, the noise is in said power consuming devices 54 connected to said power consuming device supply line 40 is reduced significantly.

Voltage shoulders of about 20V with an instantaneous amount of the voltage between 20V and 60V and a duration from 10 ms to 100 ms have shown the most convenient effects, whereby the person skilled in the art will also use larger values as well as values which are more narrow.

During said shift keying, the voltage supply source 32 is exposed to all the current caused on said power consuming device supply line 40, effected by the reactive currents as well as by the current, caused by the voltage and to the impedance of said power consuming devices 54, 62. Said power supply source 32 can be designed in a low resistance manner hereby providing the effect that the amount of said currents in question can be supplied without any problem, which means that the modulator 30 can supervise said data to be transmitted via said power consuming device supply line 40 which means that an operator of such a circuit can supervise all the data transmittable on said power consuming device supply line 40 totally.

According to this concept, the effect is provided, that the data signal is not even falsified in the case that high portions of reactive current as well as portions of active current are provided in the power consuming device supply line 40 and the effect is provided as well, that said modulator 30 itself does not falsify the behaviour of said power consuming devices 54, 62, connected to said power consuming device supply line 40 by his short termed shift keying using a narrow voltage shoulder compared to the voltage in said network, like in a bulb representing such a power consuming device 54, 62 which does not show any modification (which means that it does not blink) of its illuminating capacity during such an data-modulation even in the case that said data-modulation takes a plurality or even many sinus waves.

This means that according to the invention also power consuming devices can be supplied with data via said supply line, which show a certain sensitivity considering changes in the behaviour or in the character of the supplying power or which would indicate such a change in the supplying power to the operator immediately like it is the case for bulbs for instance.

In the case that said source of power 32 is adjustable, its voltage can also be defined by said control unit 33, as shown by the line of action 32a.

Further more, said modulator can also comprise one or more data interfaces 34, which are capable to receive control information even by external control systems, data carriers, sensors, whereby the data comprised herein are adapted by said modulation and are impressed upon said power consuming device supply line by a functional relation defined constructional or embedded in a software-program.

Exemplary data interfaces to receive data can be set up by common switches, by gateways, which do provide a connection to other control systems, by control signals, transmitted by radio or by infrared or by receiving data from computers, all known by the person skilled in the art.

FIG. 1 also shows an example a connection of three current consumers/appliances, all of them connected to the power consuming device supply line 40: the receiving unit 50, the receiving unit 55, and the switch 61. Further more also the power consuming devices 54, 62 are shown in FIG. 1, both of them providing a controlling effect and/or a switching effect, based on the data they received.

As an example only a receiving unit 50 is shown in FIG. 1, which is connected to the actuator 53. The participant 61 is a common switch, switching a bulb 62, connected to a power consuming device supply line 40.

The combination of switch 61 and lamp 62 represents an arbitrarily conventional power consuming device 54, which can be operated at a common power consuming device supply line 40, i.e. a not modulated one without getting affected by the system.

Inside said receiving unit 50, an effective power consuming device 51 is connected to the AC-power supplied via the power consuming device supply line.

In this case a decoding-unit 52 identifies the instantaneous amount of the effective power consumed by the effective power consuming device 51 and evaluates its temporal characteristics in such a manner, that the change of these characteristics, caused by the modulation and compared with the common AC-sinus sinus wave is identified a function, defined by software or defined constructional.

According to a further method or by a data protocol respectively the analyzing unit filters all the data dedicated for it afterwards and controls the actuator 53 depending on the significance previously defined whereby said actuator is capable to switch for instance a bulb or any other power consuming device on and off, such that said modulation of data becomes specifically remote controllable via said power consuming device supply line 40. Other examples of such actuators are dimmers or other devices providing an equivalent effect for said power consuming device.

Even further appliances capable to provide an effect like for instance dimming lamps or changing the speed of fans or even further effects of electric power consuming devices or providing an impact upon electromechanical actuator can be controlled remotely according to the present invention, by connecting them or by connecting their actuator 53 to the receiving unlit 50 via the decoding unit 52.

The identification of the instantaneous amount of effective power, set free in said power consuming device can also be realized by an electric or electronic operating tester or even by an adequate micro controller by digitalizing the values? of the voltage provided by the power consuming device supply line 40 whereby also the respective numeric analysis is processed, whereby in the last case said effective power consuming device 51 does not have to be part of the physical circuit anymore, but its physical behaviour can also be adapted by a microcontroller comprised in the decoding unit 52 numerically.

As an example only and representing participant a connection in FIG. 1, a receiving unit 55 is shown without any power consuming device or control unit 53 connected to it.

Said receiving unit 55 just comprises the effective power consuming devices 51 as well as the decoding-unit 52, both of them already known from the receiving-unit 50 which is there connected with the actuator 53, whereby the decoding-unit 52 transforms said data received according to a scheme, previously defined or whereby said decoding-unit 52 alternatively forwards them to a infrared-transmission-diode 56 for instance, whereby said data can be detected by a corresponding device, like an infrared-receiving-unit of a TV-set for instance locally separated from said receiving unit 55. Additional alternative interfaces, via which said data which were received by said receiving unit 55 can be forwarded, are represented by radio-transmission-systems, computer-systems, gateways and other control-systems of the like or even by device-specific interfaces, such that operating said data with the effect that said data are analyzed can also take place outside said receiving unit 55, which means that it can take place inside the respective remote device to be controlled.

The invention claimed is:

1. A method for modulating the effective power in one or more power consuming devices disposed in an A/C-power supply network having a power supply line by at least one modulator in order to provide transmission of data via the power supply line, comprising the step of specifically varying exclusively the effective power on the power supply line via a DC voltage source when the one or more power consuming devices are connected to and receiving power from the power supply line during a period of time when the one or more power consuming devices are not receiving A/C power from the power supply line, wherein only the instantaneous amount of said effective power is altered, in order to effect the transmission of the data.

2. The method according to claim 1, wherein the effective power is varied by shift keying, wherein varying the effective power by shift keying can take place at any point of the respective sinus-curve.

3. The method according to claim 1, wherein the transmission of data is analog or digital, wherein the effective power is varied by shift keying, wherein the transmission is effected by varying the intensity or the duration of the shift keying.

4. The method according to claim 2, wherein the transmission of data is analog or digital data, wherein the transmission is effected by varying the intensity or the duration of said shift keying.

5. The method according to claim 1, wherein a plurality of modulators are operating simultaneously.

6. The method according to claim 2, wherein varying the effective power by shift keying takes place at particularly the point of the respective sinus-curve to effect a reduction of noise previously provided in the power supply line.

7. The method according to claim 3, wherein varying the effective power by shift keying takes place at particularly the point of the respective sinus-curve to effect a reduction of noise previously provided in the power supply line.

8. The method according to claim 4, wherein varying the effective power by shift keying takes place at particularly the point of the respective sinus-curve to effect a reduction of noise previously provided in the power supply line.

9. The method according to claim 1, wherein the at least one modulator is provided in a single unit.

10. The method according to claim 1, wherein a plurality of modulators is used, wherein the modulators are allocated in a plurality of units, wherein each unit is located in a different position on the power supply line.

11. The method according to claim 1, wherein an identification and conversion of the data, after it is received, is performed by at least one demodulator.

12. The method according to claim 1, wherein identification and conversion of the data, after it is received, is performed by a unit distinct from the modulator or a demodulator.

13. A system for modulating the effective power in one or more power consuming devices disposed in an A/C power supply network having a power supply line to provide power to the power consuming devices, the system comprising:
at least one modulator configured to impress data into said A/C power supply network; and
at least one demodulator configured to identify and analyze the data transmitted on the A/C power supply network, wherein the at least one modulator and the at least one demodulator are connected to each other by the power supply line, wherein the power supply line is connected to an A/C power supply to receive energy, wherein the at least one modulator is configured to alter the instantaneous amount of the effective power on the power supply line when the one or more power consuming devices are connected to and receiving electrical power from the power supply line by increasing or decreasing only the instantaneous amounts of effective power portion via a DC voltage source during a period of time when the one or more power consuming devices are not receiving A/C power from the power supply line, wherein the at least one demodulator is configured to identify and analyze the resultant alterations.

* * * * *